Jan. 16, 1968  C. W. YOUNGBLOOD  3,363,321
ELECTRONIC GAUGE APPLICATION
Filed July 1, 1964  2 Sheets-Sheet 1
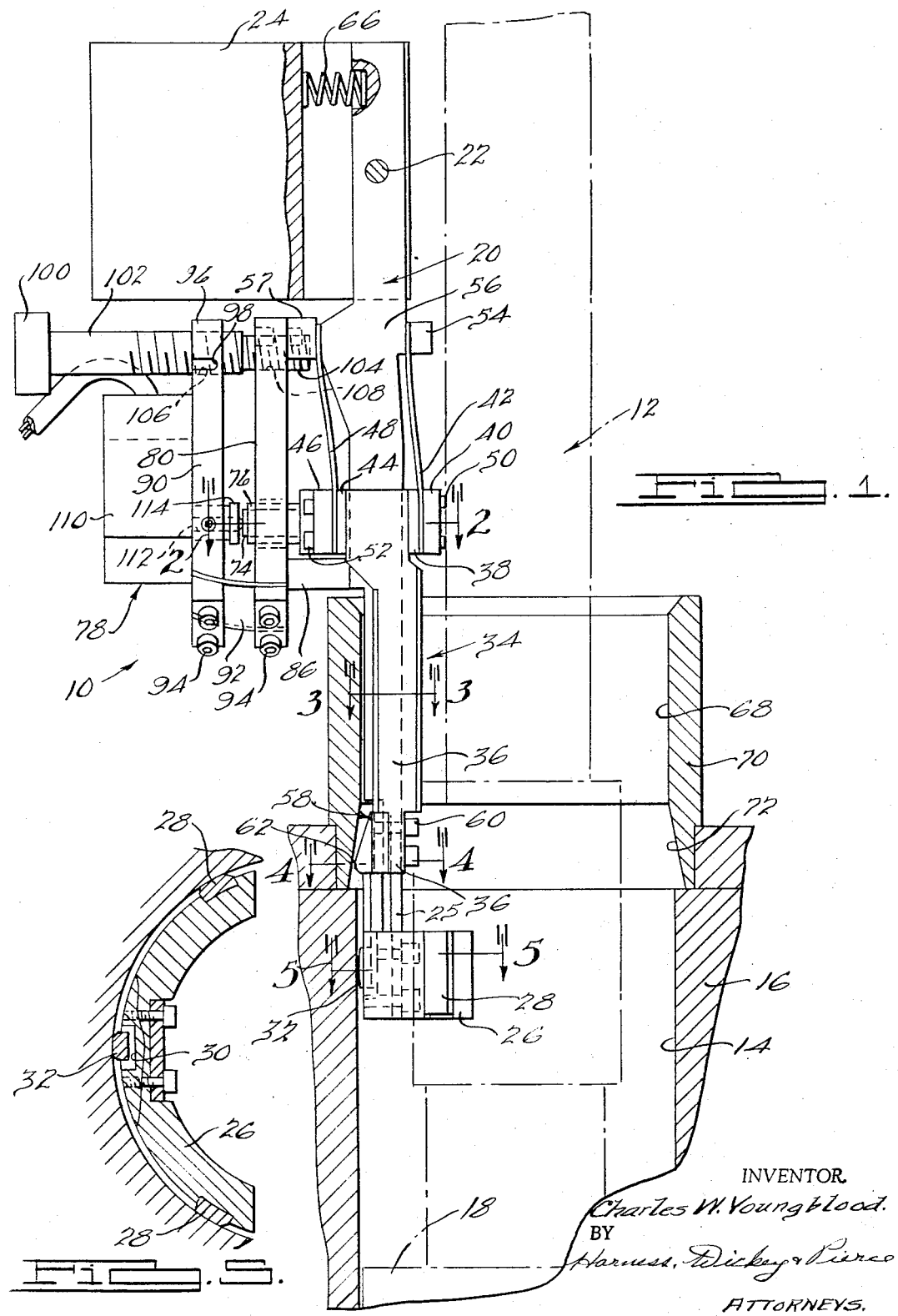
INVENTOR.
Charles W. Youngblood.
BY
Harness, Dickey & Pierce
ATTORNEYS.

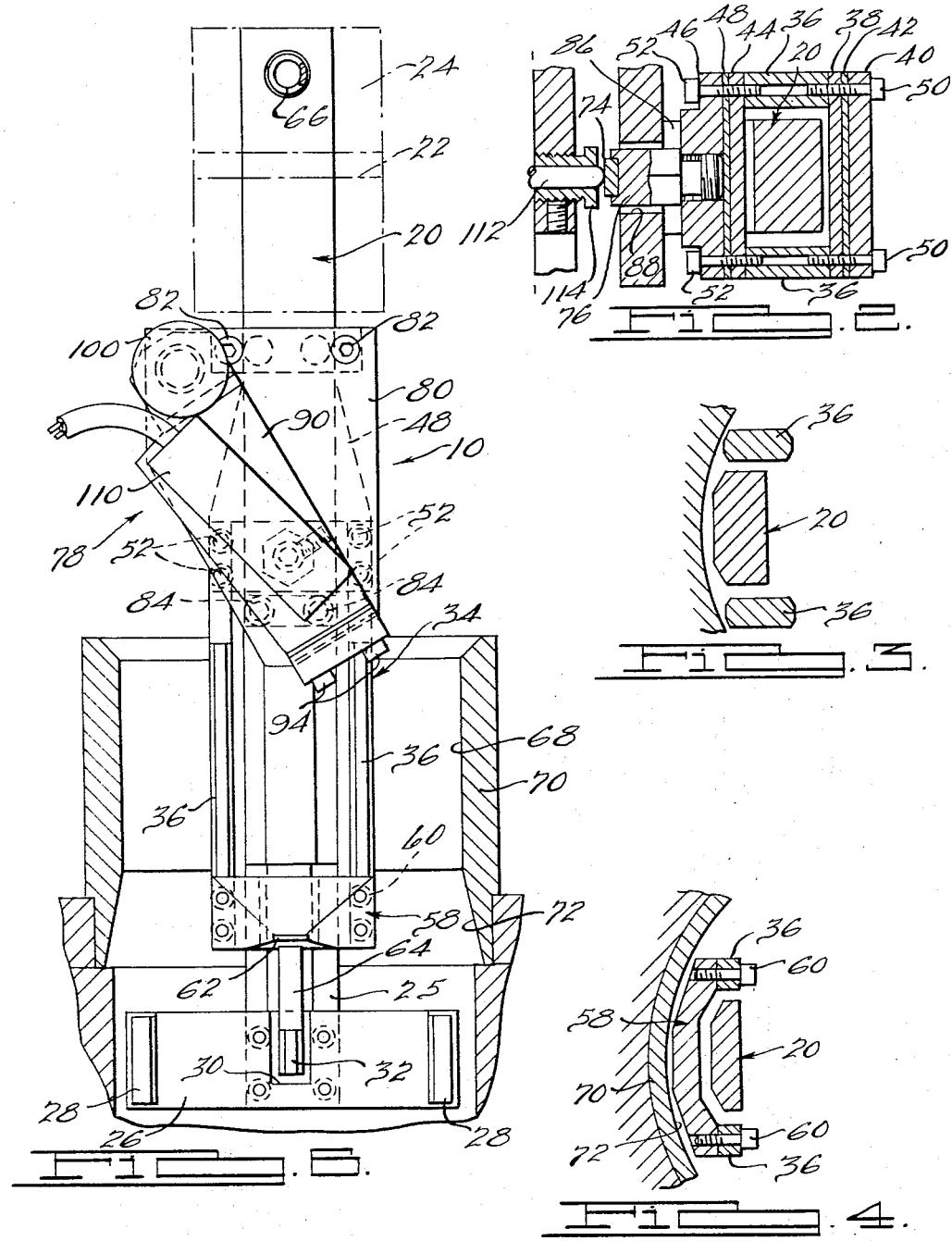

United States Patent Office 3,363,321
Patented Jan. 16, 1968

3,363,321
ELECTRONIC GAUGE APPLICATION
Charles W. Youngblood, Royal Oak, Mich., assignor to Micromatic Hone Corporation, Detroit, Mich., a corporation of Michigan
Filed July 1, 1964, Ser. No. 379,583
5 Claims. (Cl. 33—178)

This invention relates to gauging devices and more particularly to devices for gauging bore sizes.

The present invention is shown and described in conjunction with apparatus for honing bores and provides an indication of the enlargement of the bore. In general, the present invention is an improvement of that type of gauging apparatus shown and described in the United States patent to Greening et al. 3,059,381, issued Oct. 23, 1962.

Therefore, it is a general object of the present invention to provide improved gauging apparatus.

It is another object of this invention to provide improved gauging apparatus for providing an indication of a bore size during the honing of that bore.

It is another object of this invention to provide improved gauging apparatus for use with honing apparatus which is rotated and reciprocated in the honing of a bore for providing an indication of the size of the bore during the honing operation.

Other objects, features, and advantages of the present invention will become apparent from the subsequent description and the appended claims, taken in conjunction with the accompanying drawings, in which:

FIGURE 1 is a side elevational view of a preferred form of a gauging device embodying features of the present invention and shown in operating relationship with a guide bushing and a workpiece to be honed and with honing apparatus generally outlined in phantom;

FIGURE 2 is a sectional view of the gauging device of FIGURE 1 taken substantially along the line 2—2;

FIGURE 3 is a sectional view of the gauging device of FIGURE 1 taken substantially along the line 3—3;

FIGURE 4 is a sectional view of the gauging device of FIGURE 1 taken substantially along the line 4—4;

FIGURE 5 is a sectional view of the gauging device of FIGURE 1 taken substantially along the line 5—5; and FIGURE 6 is a front elevational view of the gauging device of FIGURE 1 shown in operating relationship with the guide bushing and workpiece.

A gauging device 10 and honing apparatus 12 (shown in phantom) are operatively connected by means similar to that shown in the patent to Greening et al. supra, and hence the device 10 provides an indication of the size of a bore 14 in a workpiece 16 being honed by the apparatus 12. The apparatus 12 includes a honing head 18 which is rotated within the bore 14 and which is reciprocated axially therein in accordance with well known techniques. As the honing apparatus 12 is reciprocated the gauging device 10 is reciprocated therewith into and out of the bore 14 and provides a new reading or bore size indication upon each new stroke. Upon a predetermined size indication of the honing apparatus 12 can be automatically retracted and the honing operation of that bore discontinued; this latter function can be performed by means (not shown) well known in the art.

The gauging device 10 includes an elongated gauge cam support arm 20 which is pivotally supported near its upper end at a pivot 22 to a support block 24. The support arm 20 extends for substantially the length of the device 10 and has secured at its lower extremity 25 a chord contact member 26 which has an arcuate shape in the form of a portion of a circle. The chord contact member 26 has a pair of circumferentially spaced, hardened, fixed contact members 28 which extend outwardly therefrom and has a slot 30 located midway between the contact members 28 for receiving a movable contact member 32 which is a part of a separate gauge lever assembly 34 to be described.

The lever assembly 34 includes a pair of identical lever arms 36 located on opposite sides of the cam support arm 20. The lever arms 36 are connected together at their rearward sides at their upper extremities by a pair of cross bars 38, 40 having the lower end of a flat spring 42 sandwiched therebetween (FIGURES 1 and 2) and with all being connected together by bolts such as bolt 50. The lever arms 36 are similarly connected together at their forward sides by a pair of cross bars 44, 46 having the lower end of a flat spring 48 sandwiched therebetween and with all being connected together by bolts such as bolt 52. The upper ends of the flat springs 42 and 48 are connected to the rearward and forward surfaces, respectively, of the cam support arm 20 by bolts 54 at an increased section portion 56 between the pivot 22 and its lower end with the bolts 54 threadably engaging a base support bar 57. The arms 36 extend downwardly from the springs 42, 48 and terminate short of the lower extremity 25 of the cam support arm 20 and are connected together at their lower extremities by a gauge cam member 58. The gauge cam member 58 is secured across the forward surface of the arms 36 by bolts 60 and has a forwardly extending cam surface 62 which serves a purpose to be described. A downwardly depending leg portion 64 terminates within the slot 30 in the chord contact member 26 and has integrally formed at its lower extremity the movable contact member 32.

In operation, a spring member 66 is located in the support block 24 and engages the cam support arm 20 above the pivot 22 and urges the lower extremity of the arms 20 forwardly. The lever assembly 34, which is fixed to the arms 20, is also urged forwardly. With the device 10 located upwardly from and in clearance relation with the bore 14 of the workpiece 16 the flat springs 42, 48 urge the lever assembly 34 farther outwardly, moving the movable contact member 32 outwardly from its associated slot 30. In this condition the lower extremity of the device 10 is located within a bore 68 of a guide bushing 70 which is larger than and located in coaxial alignment with the bore 14 to be honed. The cam surface 62 is designed to project forwardly farther than the forward extremity of the movable contact member 32 and hence with the device 10 in its retracted upper position the cam surface 62 engages the wall of the bore 68 and moves the lever assembly 34 rearwardly against the force of the springs 42, 48 and into engagement with the support arm 20 and moves the support arm 20 rearwardly against the force of the spring 66. Thus upon retraction of the device 10 from the bore 14, the cam surface 62 cooperates with the guide bushing 70 to move the movable contact 32 and fixed contact 28 rearwardly and out of engagement with the bore 68. The bore 68 terminates in an outwardly tapered portion 72 at its lower end so as to provide a camming action with the cam surface 62 as the device 10 is reciprocated into and out of the bore 14. With the device 10 in its fully down position within the bore 14 the spring 66 moves the lower portion of support arm 20 outwardly until the fixed contacts 28 engage the surface of the bore 14 and the springs 42, 48 urge the lever assembly 34 outwardly until the movable contact 32 engages the surface of the bore 14; in this position the cam surface 62 no longer engages the tapered portion 72. The three points of contact with the surface of the bore 14 as provided by the fixed contacts 28 and movable contact 32 provide means for geometrically determining the diameter of the bore 14. With the contacts 38 fixed, the position of the movable contact 32 relative thereto can be used to provide a measure of the diameter or change in diameter of the bore 14. Changes in this relative positional relationship between fixed and movable contacts results in relative movement between the arms 36 and support arm 20. This latter relative movement is detected by means of the movement of a contact button 74 located at the outer extremity of a gauge post member 76 which is threadedly secured to the cross bar 46 and extends forwardly therefrom (FIGURE 2). The flat springs 42, 48 are connected in spaced parallelism and generally back-to-back relative to the direction of relative movement between arms 36 and arm 20 and prevent relative pivotal movement of arms 36 relative to the support arm 20 and upon deflection provide parallelograming motion whereby the post member 76 and contact button 74 move generally parallelly relative to the line of deflection of the movable contact 32; thus any errors due to pivotal movement of arms 36 relative to support arm 20 are eliminated. At the same time the amount of deflection of the movable contact 32 and of the contact button 74 will be substantially equal.

The physical deflection of the contact button 74 can be detected and converted into an electrical signal by means of an electrical transducer assembly 78. The transducer assembly 78 is of the type shown and described in my copending United States patent application Serial No. 351,013, filed March 11, 1964, which became Patent No. 3,308,357, issued March 7, 1967. In general the transducer assembly 78 includes a stationary base member 80 which is fixed at its upper end to the base support member 57 via bolts 82. The stationary base member 80 is fixed to the support arm 20 at its lower end via bolts 84 with a spacer member 86 located therebetween to properly orient the base member 80. The stationary base member 80 has an aperture 88 which is in line with the post 76 which extends therethrough with the contact button 74 located outwardly on the forward side of the base member 80. An adjustable base member 90 has one end secured to one end of the stationary base member 80 via a flat spring member 92 and a plurality of bolts 94. The opposite end portion 96 of the adjustable base member 90 is separated from the remainder of member 90 by a reduced section 98. A calibration bolt 100 having enlarged diameter and reduced diameter portions 102 and 104, respectively, has its enlarged diameter portion 102 in threaded engagement with a bore 106 in the end portion 96 and has its reduced diameter portion 104 in threaded engagement with a bore 108 in the stationary base member 80. A capacitive type transducer member 110 is fixed to the adjustable base member 90 and has a plunger member 112 (FIGURES 1 and 2) extending through a bushing 114 located in alignment with the bores 88 through the stationary base member 80 whereby the plunger member 112 engages the contact button 74. The transducer member 110 can be of the type shown in the United States patent to M. M. Arlin, No. 2,908,980, issued Oct. 20, 1959 with the capacitance being a part of an oscillator network shown therein such that a change in capacitance provides a corresponding change in the amplitude of the output signal. This output signal then can be used to provide an indication of the magnitude of the deflection of the contact button 74 and hence of the deflection of the movable contact member 32. By proper calibration, then, the output signal could indicate the diameter or change in diameter of the bore 14 after each reciprocatory cycle of the honing apparatus 12 and hence of the gauging device 10. The transducer assembly 78 can be adjusted and calibrated by manipulation of the calibration bolt 100 in a manner described in my copending application previously noted.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. For use with honing apparatus for honing a bore by a combination of rotational and reciprocatory motion, a gauging device for measuring the diameter of the bore comprising: an elongated support arm member pivotally supported at its upper end, a pair of spaced contact members fixed to the lower end of said support arm member at its forward surface, a pair of lever arms located on opposite sides of said support arm member, a movable contact member fixed to the lower ends of said lever arms and located in front of the forward surface of said support arm member and in between said spaced contacts members, a pair of flat spring members, means connecting the upper ends of said spring members to the forward and rearward surfaces, respectively, of said support arm member intermediate its ends and connecting the lower ends of said spring members to the upper ends of said lever arms with said spring members extending substantially in spaced parallelism and generally back-to-back relative to the direction of relative movement between said support arm member and said lever arms and with said spring members normally urging said lever arms forwardly, spring means for urging the lower portion of said support arm member forwardly about its pivot point, and means connecting said gauging device with the honing apparatus for reciprocation therewith, and guide means adapted to be located proximate the bore and having a guide surface for guiding said gauging device as it is moved into and out of said bore, said gauging device further comprising a cam member fixed to the movable contact member and located thereabove and having a cam surface extending forwardly beyond the bore engaging surface of said movable contact member and engageable with said guide surface, said guide surface having a preselected contour whereby the bore engaging surfaces of said spaced and movable contact members can be cammed into and out of engagement with the bore as said cam surface moves along said guide surface in response to reciprocation of the gauging device downwardly and upwardly, respectively, and transducer means supported on said support arm member and connected with said lever arms for providing a change in an electrical characteristic responsively to a change in the relative distance between said support arm member and said lever arms.

2. A gauging device for providing an indication of the diameter of an arcuate surface comprising: a first elongated arm member having a pair of spaced contact portions located at the front of said first arm member and engageable with the arcuate surface, a second elongated arm member having a contact portion located intermediate said spaced contact portions and at the front of said second arm member and engageable with the arcuate surface, a pair of flat spring members, means connecting one of the ends of said spring members to one of said arm members and the opposite ends to the other of said arm members with said spring members extending substantially in spaced parallelism and generally with one in back of the other relative to the direction of relative movement between said arm members, said means connecting said arm members and said spring members at points substantially axially removed from said spaced contact portions and said intermediate contact portion, and transducer means connected to said arm members at a location substantially axially removed from the arcuate surface being gauged for providing a change in an electrical characteristic responsively to a change in the relative distance between said arm members, said transducer means including a contact member located at a position substantially axially spaced from said intermediate contact portion.

3. A gauging device for providing an indication of the diameter of an arcuate surface comprising: a first elongated arm member having a pair of spaced contact portions engageable with the arcuate surface, a second elongated arm member having a contact portion located intermediate said spaced contact portions and engageable with the arcuate surface, spring means connecting said first and second arm members and preventing relative pivotal movement therebetween and permitting substantially solely relative translational movement therebetween and transducer means connected to said arm members at a location substantially axially removed from the arcuate surface being gauged for providing an indication responsively to a change in the relative distance between said arm members, said transducer means including a contact member located at a position substantially axially spaced from said intermediate contact portion.

4. A gauging device for providing an indication of the diameter of an arcuate surface comprising: a first elongated arm member having a pair of spaced contact portions engageable with the arcuate surface, a second elongated arm member having a contact portion located intermediate said spaced contact portions and engageable with the arcuate surface, a pair of flat spring members, and means connecting one of the ends of said spring members to one of said arm members and the opposite ends to the other of said arm members with said spring members extending substantially in spaced parallelism and generally with one in back of the other relative to the direction of relative movement between said arm members whereby said arm members will move substantially solely in translation relative to each other and transducer means connected to said arm members at a location substantially axially removed from the arcuate surface being gauged for providing an indication responsively to a change in the relative distance between said arm members, said transducer means including a contact member located at a position substantially axially spaced from said intermediate contact portion.

5. A gauging device for providing an indication of the diameter of an arcuate surface comprising a first arm member having a pair of spaced contact portions located at the front of said first arm member and engageable with the arcuate surface, a second arm member having a second contact portion located intermediate said spaced contact portions and at the front of said second arm member and engageable with the arcuate surface, a pair of flat spring members, and means connecting one of the ends of said spring members to one of said arm members and the opposite ends of said spring members to the other of said arm members with said spring members extending substantially in spaced parallelism and generally with one in back of the other relative to the direction of relative movement between said arm members whereby said arm members will move substantially solely in translation relative to each other and transducer means connected to said arm members at a location substantially axially removed from the arcuate surface being gauged for providing an indication responsively to a change in the relative distance between said arm members, said transducer means including a contact member located at a position substantially axially spaced from said intermediate contact portion.

References Cited

UNITED STATES PATENTS

| | | | |
|---|---|---|---|
| 2,197,198 | 4/1940 | Street | 33—178 |
| 2,355,316 | 8/1944 | Mestas | 33—178 |
| 2,397,196 | 3/1946 | Neff | 33—178 |
| 2,411,292 | 11/1946 | Rappl | 33—178 |
| 2,662,297 | 12/1953 | Reicherter | 33—178 |
| 2,802,276 | 8/1957 | Straw | 33—178 |

SAMUEL S. MATTHEWS, *Primary Examiner.*